United States Patent [19]
Flohr et al.

[11] Patent Number: 4,848,823
[45] Date of Patent: Jul. 18, 1989

[54] REMOTE CONTROL POWER-ASSISTED VEHICLE COVER

[75] Inventors: Arno K. Flohr, Oceanside; Edward J. Fasiska, Carlsbad, both of Calif.

[73] Assignee: Entretec, Inc., Pittsburgh, Pa.

[21] Appl. No.: 106,816

[22] Filed: Oct. 13, 1987

[51] Int. Cl.[4] .................. B60J 11/00; G08C 19/00
[52] U.S. Cl. .................................. 296/98; 160/310; 296/136; 340/825.69
[58] Field of Search ............ 296/98, 136; 135/88, 135/117, DIG. 5; 160/7, 23.1, 263, DIG. 2, 310, 66, DIG. 4; 150/52 K; 242/55; 200/330, 331; 340/825.69, 825.72; 318/16

[56] References Cited

U.S. PATENT DOCUMENTS

| | | | |
|---|---|---|---|
| 1,238,642 | 8/1917 | Crump | 160/263 |
| 1,719,055 | 7/1929 | Herzer | 296/136 |
| 1,912,231 | 5/1933 | Wandscheer | 296/136 |
| 1,999,171 | 4/1935 | Bryant | 296/136 |
| 2,688,513 | 9/1954 | Poirier | 296/98 |
| 2,811,321 | 10/1957 | Barre | 296/98 X |
| 3,222,102 | 12/1965 | Lucas | 296/136 |
| 3,992,053 | 11/1976 | Hrytzak | 296/136 |
| 4,174,134 | 11/1979 | Mathis | 296/136 |
| 4,274,077 | 6/1981 | Feiger | 340/63 |
| 4,432,581 | 2/1984 | Guma | 296/136 |
| 4,519,644 | 5/1985 | Song | 296/136 |
| 4,596,418 | 6/1987 | Koh | 296/136 |
| 4,657,298 | 4/1987 | Yong | 135/88 X |

FOREIGN PATENT DOCUMENTS

| | | | |
|---|---|---|---|
| 1074987 | 10/1954 | France | 296/136 |
| 2524398 | 10/1983 | France | 296/136 |

Primary Examiner—Robert J. Oberleitner
Attorney, Agent, or Firm—Webb, Burden, Ziesenheim & Webb

[57] ABSTRACT

A remotely controlled power-assisted vehicle cover is attached to a take-up spool winding and unwinding mechanism which is housed in an eccentric-shaped containment tube, mounted under the front or back bumper areas of a vehicle. The vehicle cover is extracted from the cylindrical cover containment tube and placed over a vehicle by a wand fastened to the leading edge of the vehicle cover and houses a wireless control system including a remote motor control and a transmitter to send: on/off, single or variable speed, and reversing controls to the drive motor of the cover extracting-/retracting mechanism. In addition to controlling the cover drive motor, the control wand is used to physically guide the protective cover on or off the vehicle. The control wand can easily be operated with one hand and enables precise control of the power-assisted application or removal of the vehicle cover. The cover application operation is done so quickly that a blanket of air is trapped between the cover and the vehicle and helps the cover slide freely over the surface of the vehicle.

6 Claims, 4 Drawing Sheets

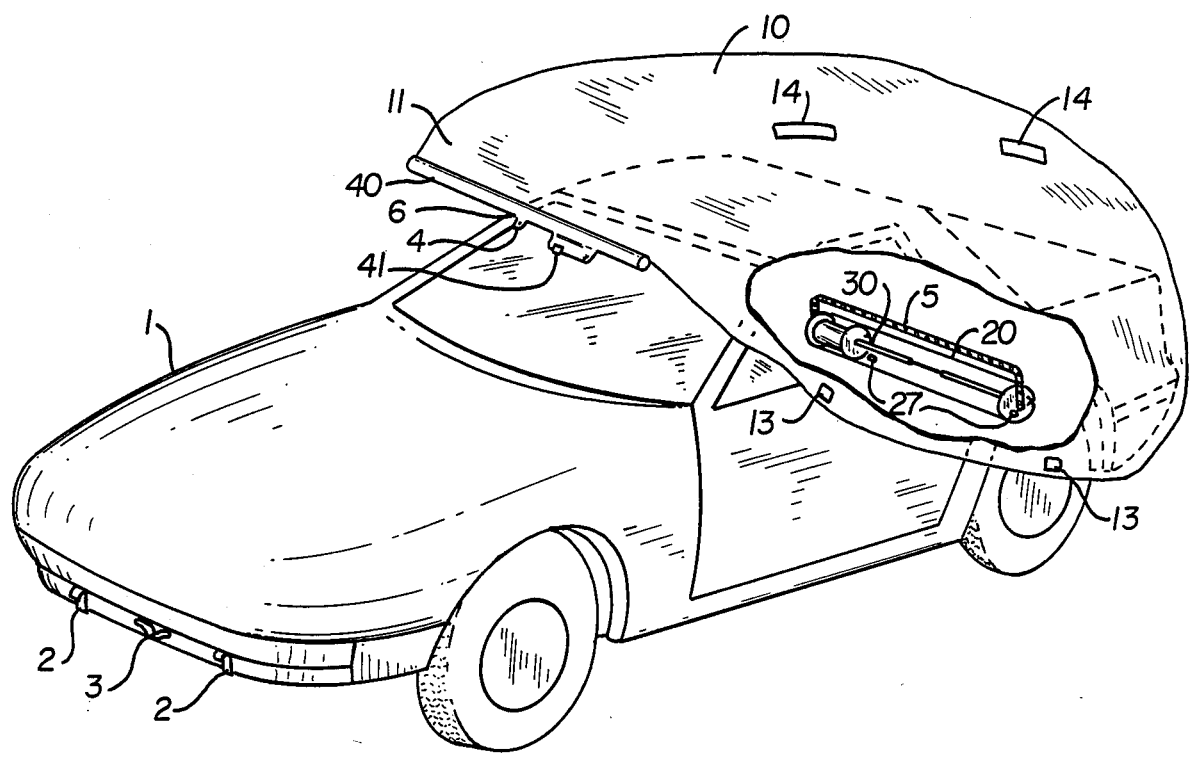
FIG. 1
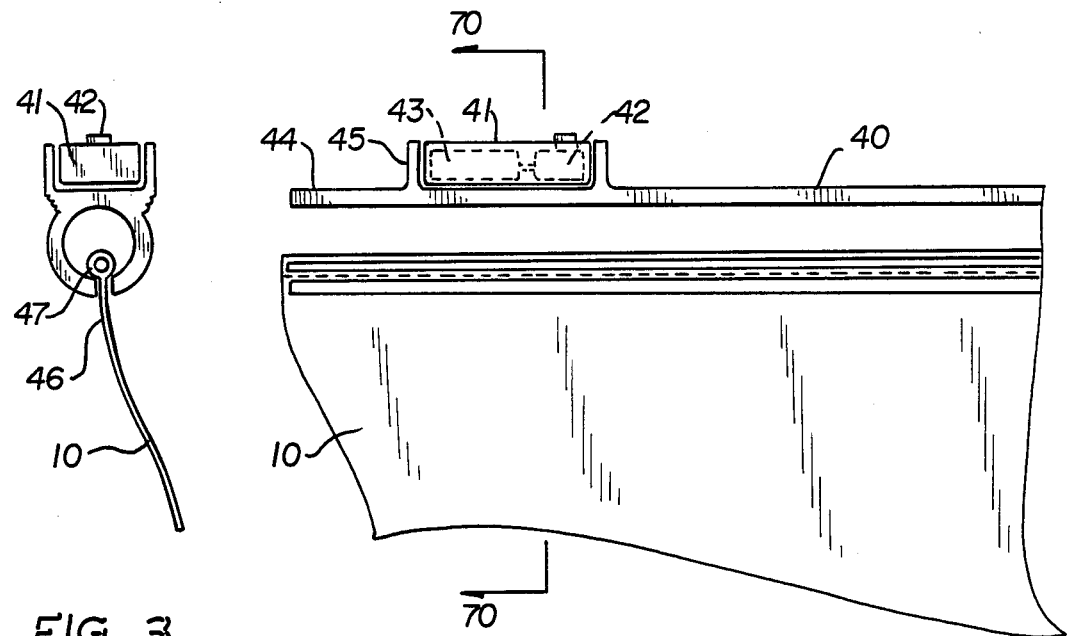
FIG. 3
FIG. 2

REMOTE CONTROL POWER-ASSISTED VEHICLE COVER

BACKGROUND OF THE INVENTION

1. Field of the Invention

The invention relates to vehicle covers that can be rapidly extracted from a storage compartment and applied to protect the body of a vehicle and rapidly retracted into the storage compartment using a power assisted system.

Automobile and other vehicle covers are commonly used for protection against the harmful effects of sun, dust, dirt, smog, rain, snow, hail, acid rain and other deleterious atmospheric elements. Manual protective covers are commonly stored in the truck or other areas of vehicles. Significant shortcomings of the manual covers are the inconvenience of application and time needed to remove them from storage and apply them. The disadvantages of manual vehicle covers are overcome by the remote control power-assisted vehicle cover invention described within. The vehicle protection system invention described here has as its primary advantage over manual covers the element of convenience and speedy application. The protective cover system is self-contained, needing no storage and is always readily available. The cover can be applied or taken off the vehicle is less than one minute. Because of the speed of application, the cover system tends to be used more frequently, thus providing a natural theft deterrent as well.

2. Description of the Prior Art

A review of the prior art has revealed a number of automatic or semi-automatic vehicle covers dating back to the nineteen twenties. Several of these teach fabric covers which are stored on rollers and mount on one end of the vehicle. Some more recent inventions teach covers that are automatically extended over the body of the vehicle and retracted on rollers into storage compartments. Most of the inventions of automatic or semi-automatic vehicle covering systems described in the reviewed patents are complex in nature. They have elaborate or intricate mechanisms which are consequently expensive to build and their embodiments are cumbersome to use. Many also, incorporate permanent fixtures, guides and brackets that mount on the exterior surface of the vehicle, thus deteriorating the esthetics of the vehicle.

SUMMARY AND OBJECTS OF THE INVENTION

It is the primary objects of this invention to provide an improved, easier to construct and use and subsequently inexpensive vehicle cover.

This invention in accordance with a primary aspect comprises a cover apparatus for automobiles, vehicles, and the like, comprising a cover means of pliable material for enveloping a portion of the major body area of a vehicle; a cylindrical cover means containment tube mounted under one of the rear or front bumper areas of said automotible; a wireless control receiver, receiver/motor interface logic and circuitry, and remote controlled cover means drive motor for powering vehicle cover application and removal; a control wand means fastened to the leading edge of said cover means for physically guiding said material cover means onto and off the said automobile; a take-up spool winding and unwinding means attached to the trailing end of said material cover means and which is enclosed in said cylindrical cover means containment tube; a wireless remote transmitter control means for remotely controlling, the operational functions for extracting and retracting, of said material cover means, onto or from said power take-up spool winding and unwinding means.

BRIEF DESCRIPTION OF THE DRAWINGS

FIG. 1 is a partial isometric view of an automobile with the remote control power-assisted vehicle cover of this invention in a partially applied position showing the basic elements of the vehicle coverying system.

FIG. 2 is a partial cross sectional view of the control wand means 40 of FIG. 1, indicating the basic configuration of the control wand and showing the cover means, hand-hold, and wireless remote control means.

FIG. 3 is a partial cross sectional view along line 70—70 of FIG. 2, showing the wireless remote control means of the control wand which includes the remote drive motor control for the cover means.

DETAILED DESCRIPTION OF A PREFERRED EMBODIMENT

Figure 4:
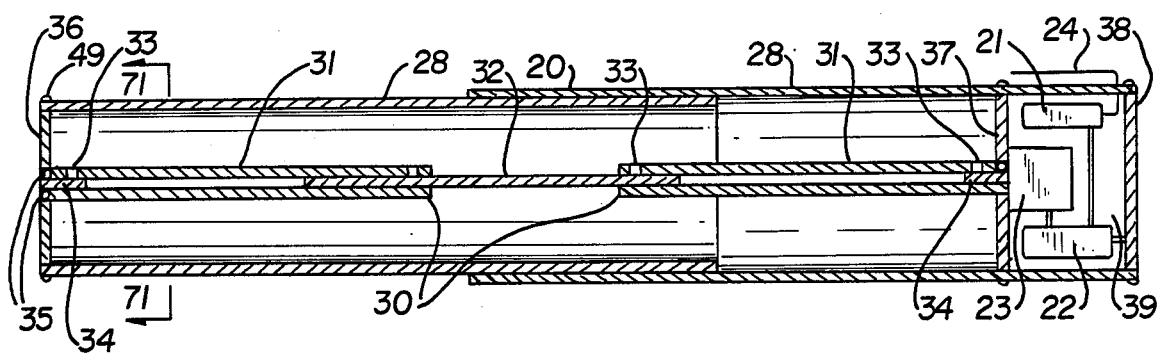
FIG. 4 is a partial cross sectional view of the cylindrical cover means containment tube exposing the details of the telescoping action of the take-up spool winding and unwinding means and the cylindrical cover means containment tube and the mounting positions of the wireless control receiver, receiver/motor interface logic and circuitry and the cover emans drive motor.

A preferred embodiment of this invention, illustrated in the partial isometric view of FIG. 1, is a cover apparatus for automobiles, vehicles, and the like, in a partially applied position on an automobile 1, comprising in combination: a cover means 10 of pliable material for enveloping a portion of the major body area of a vehicle; a cylindrical cover means containment tube 20 mounted under one of the rear or front bumper areas of said automobile; referring to FIG. 4, a wireless control receiver 21, receiver/motor interface logic and circuitry 22, and cover means drive motor 23 for powering vehicle cover application and removal; a control wand means 40 fastened to the leading edge 11 of said cover means 10, for physically guiding said material cover means onto and off said automobile; a take-up spool winding and unwinding means 30 attached to the trailing edge 12 of said material cover means 10 and which is enclosed in said cylindrical cover means containment tube 20; a wireless remote control means 41 for remotely controlling, the operational functions, extracting and retracting, of said material cover means 10, onto or from said power take-up spool winding and unwinding means 30.

The control wand means 40 can easily be operated with one hand and enables precise control of the power-assisted application or removal of the vehicle cover means 10. In addition to controlling the cover means drive motor 23, the control wand is used to physically guide the protective cover means 10 on or off the vehicle. The vehicle cover is extracted from the cylindrical cover means containment tube 20 and placed over a vehicle in less than one minute or retracted into the containment tube 20 for storage, also in less than one minute. The cover application operation is done so quickly that a blanket of air 6 is trapped between the cover and the vehicle surface helping the cover glide freely over the surface vehicle. Two control wand clips 2 are mounted under the vehicle at the opposite end from the containment tube position, to fasten the control wand means 40 and cover means 10 when the cover means is in the applied position on the vehicle and to stabilize the cover means in windy conditions. A cover locking mechanism 3 is also fastened to the underside of the vehicle, at the opposite end from which the cylindrical cover means containment tube is mounted. A mating cover means locking hook 4 is mounted on the control wand means to lock the cover onto the vehicle when it is in the applied position on the vehicle.

A variety of synthetic and natural materials including nylon, dacron, cotton, acetylated cotton, and blends of the natural and synthetic materials can be used as the primary material for the cover means 10. The preferred material is nylon because of its light weight, strength, rot resistance, mildew resistance, and inexpensiveness. A light color cover with a high reflectivity is preferred to reflect the sun away from the cover surface. Because the cover material is in intimate contact with the vehicle surface, ideally, a cover with a light color on the upper side and a dark color on the underside is preferred. The light color upper side reflects the sun away from the cover surface and the dark color on the underside absorbs heat radiated and conducted from the vehicle surface beneath, thereby transmitting the heat away from the hot vehicle surface.

The control wand, illustrated in the partial cross sectional view of FIG. 2, houses a wireless remote control means 41 which includes the remote cover means motor control 42 and the radio frequency transmitter 43. The radio frequency transmitter 43 of the wireless remote control means 41 in the control wand means 40 sends radio signals to the receiver antenna 24 of the wireless control receiver 21 in the cylindrical cover means containment tube 20 for controlling the cover means drive motor 23. The control wand means may be fabricated from a section of tubing, having a suitable cover slit 46 through the entire length of one wall, parallel to its long axis, and fastened to said cover means 10 by having the leading edge of the vehicle cover means passing through the control wand means cover slit and fastened to a 1/4 inch plastic cover retaining rod 47 within the tube.

The control wand may be manufactured from a metal or plastic tube, or may be extruded from plastic with a hand-hold 44 and a wireless remote control wand means mounting receptacle 45 for the wireless remote control means unit. A plastic extrusion is preferred. This permits the hand-hold, receptacle for the wireless remote control means and cover slit for attaching the cover means to be manufactured in one operation. Plastic is also preferred because of the reduction in weight over metals, and because of the favorable aesthetics of the colored plastic materials. The radio frequency transmitter 43 and remote cover means drive motor control 42 of the wireless remote control means may be manufactured as a single electronic wireless remote control means unit 41. The control wand is molded in such a manner as to enable clipping the wireless remote control means unit 41 into the control wand means 40 or removing if for cover means drive motor control not in conjunction with the control wand.

The control wand is also used to guide the car cover on or off the vehicle FIG. 1. The uncovering and covering operations of the vehicle may be facilitated by placing four pairs of velcro tabs, two pairs on either side, two at the bottom of the vehicle cover on each side 13 and a mating pair at the top of the vehicle cover 14 on each side. Before uncovering the vehicle, the bottom side portions of the vehicle cover containing the velcro tabs 13 are folded up and fastened to matching velcro tabs 14 near the upper portion of the vehicle. This operation takes only seconds and results in a more uniform retractive motion of the cover onto the take-up spool winding and unwinding means 30. This additional operation is usually not necessary for most vehicles. It is only required on certain vehicles, usually very high profile vehicles, depending upon their body shape, or it is required in unusually windy conditions which may tend to push the cover to either side.

Figures 5, 6:
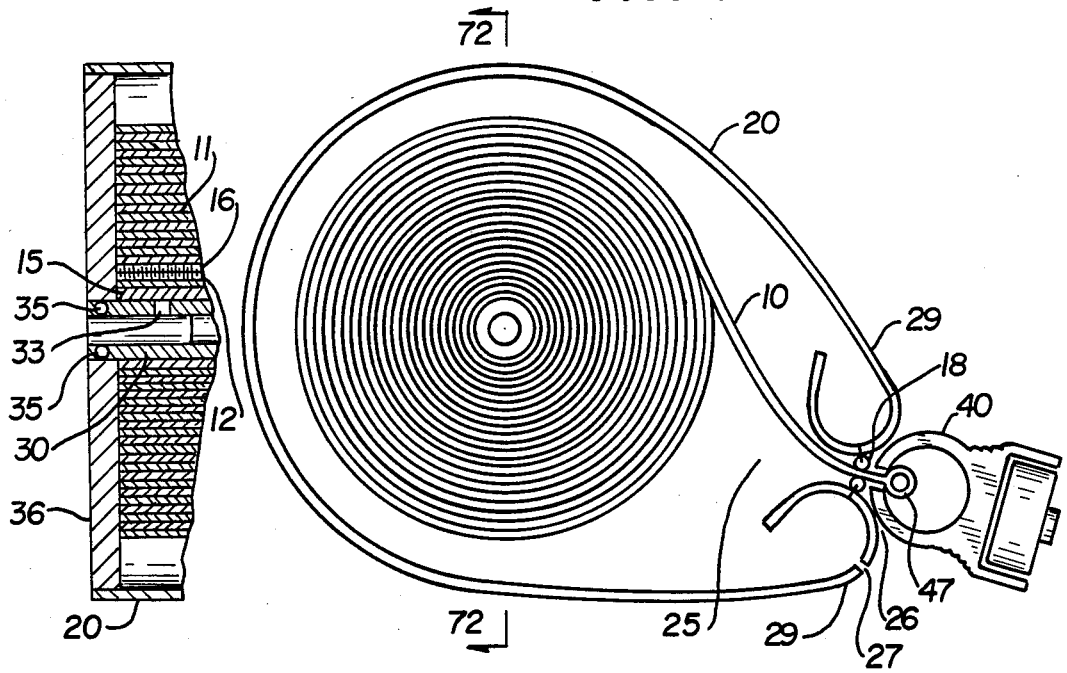
FIG. 5 is a partial cross sectional view along line 71—71 of FIG. 4 showing the eccentric shape and configuration of the walls of the cylindrical cover means containment tube, the take-up spool winding and unwinding means, and the pliable cover material in the retracted position.
FIG. 6 is a partial cross sectional view along line 72—72 of FIG. 5 showing the cover means concentrically wound layers on the take-up spool winding and unwinding means, with the cover means in the stored position.
Figure 8:
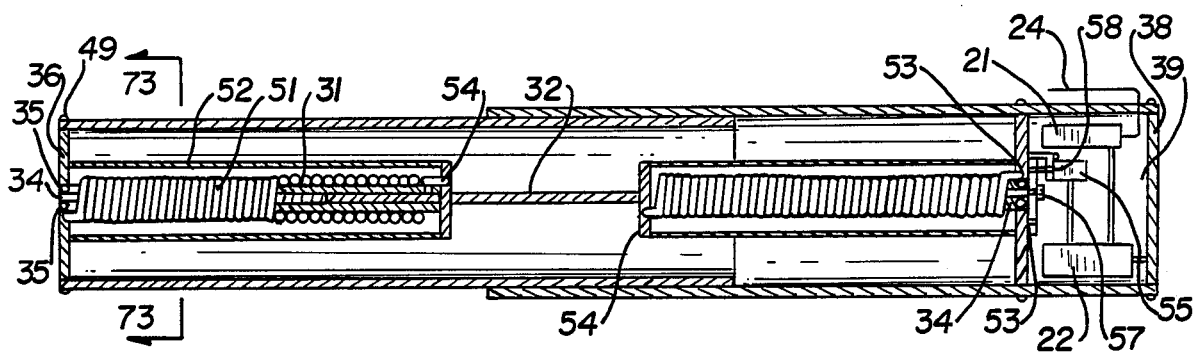
FIG. 8 is a partial cross sectional view of the cylindrical cover means containment tube exposing the details of the helical retractive spring system which is used as an alternate source of retractive power for the cover means.
Figures 9, 10:
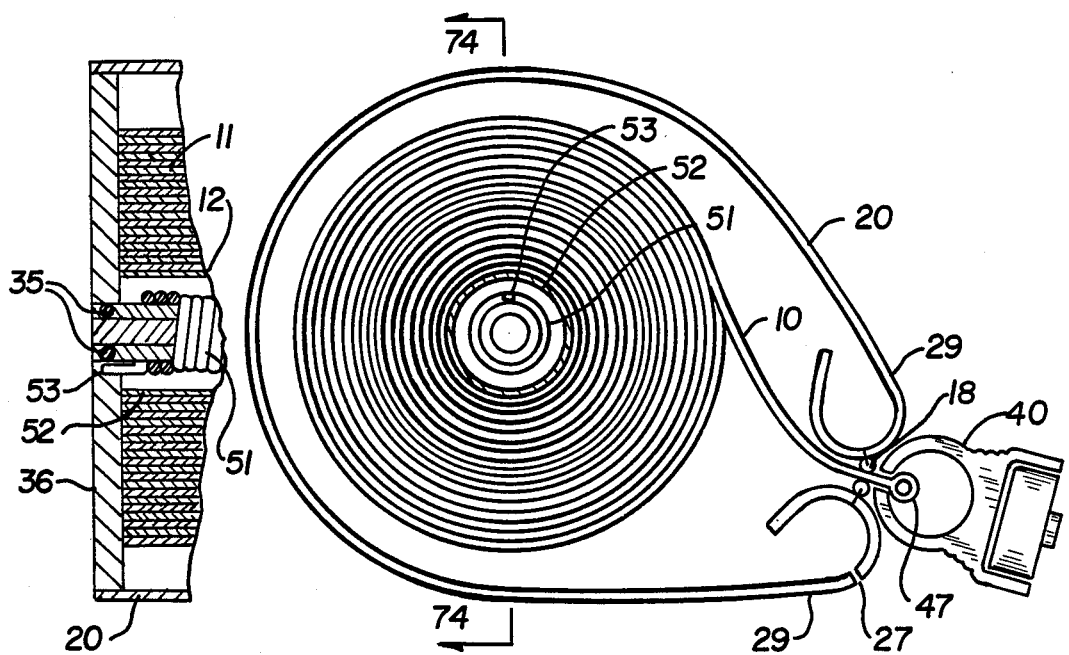
FIG. 9 is a partial cross sectional view along line 73–73 of FIG. 8 showing the helical retractive springs mounting holes and the helical retractive springs cover shields to eliminate intimate contact of the cover means with the springs.
FIG. 10 is a partial cross sectional view along line 74—74 of FIG. 9 showing the helical retractive springs mounting configurations and the concentrically wound layers of the cover means with the cover in the stored position.

This embodiment also contains a telescoping cylindrical cover means containment tube which is illustrated in the three cross sectional views: FIGS. 4, 5 and 6. The cylindrical cover means containment tube 20 has an eccentric mouth protrusion 25, near the cover entry opening slit area 26. The principal function of the containment tube is to house the cover take-up spool winding and unwinding means 30 and its remote control components; it also serves to store the protective vehicle cover means 10 when it is not in use.

The containment tube is fastened under the front or rear bumpers of a vehicle with a mounting bracket 5. The mounting bracket is U-shaped with a plurality of mounting holes along its entire length. The bracket is designed such that the distance between the containment tube and the undercarriage of the vehicle is adjustable and the angle of tilt, around the long axis of the containment tube is also adjustable. Also, the bracket is fabricated to the full length of the containment tube to take advantage of existing holes, bolts and screws of the vehicle which may be used for mounting. Typically, the mounting tilt angle of the containment tube (the angle between a horizontal plane and a plane defined by the intersection of the long central axis of the containment tube and a line representing the cover entry opening slit 26) is set at approximately 20° with the entry cover opening slit facing down and away from the vehicle to permit any water that may become trapped in the containment tube to escape through two drain holes in the containment tube 27.

The telescoping action of the cylindrical cover means containment tube 20 permits the accommodation of various sizes and weights of vehicle covers. The telescoping action is accomplished by interleaving two pre-formed sheet metal curved sections 28, of the containment tube wall material as shown in FIG. 4. The eccentric mouth design of the containment tube eliminates the cover folding back on itself, and tangling, while it is being extracted from or retracted into the containment tube.

The containment tube may be manufactured from either plastic or metal pipe, cut to length with a slot milled or cut lengthwise into it without the mouth protrusion, or it may be extruded from plastic, with the cover slot and eccentric mouth protrusion formed in a single operation. The preferred material and method of manufacturing the long walls of the containment tube is to use two curved sections of performed stainless steel sheet metal stock. This material is conducive to manufacturing the interleaving telescopic action, it has high mechanical strength and it is corrosion resistant. The pre-formed sheet metal curved containment tube sections 28 both have curled lips 29 on both sides of the cover entry opening slit 26 to provide a track for the telescoping motion and to add lateral strength to the unit. Four (two on each side) small diameter, cylindrical-shaped, plastic anti-friction rollers 18 are fastened to the non-overlapping sections of the curled lips 29 on both sides of the cover entry opening slit 26 to reduce friction between the cover material and the curled lips. The pre-formed sheet metal curved containment tube sections 28 are fastened to the end plates 36, 37, and 38 with #6 self tapping sheet metal screws 49. Aluminum and painted mild steel can also be used as the long wall pre-formed material. The interleaving telescopic motion is more difficult to manufacture using plastic materials. However, if numbers of containment units are built for a single size cover, with no telescopic feature, the plastic materials are acceptable.

Within the eccentric-shaped containment tube FIG. 4 is the take-up spool winding and unwinding means 30, having an axis coincident with the axis of the containment tube 20. The take-up spool is also telescoping, being comprised of two drive shaft tubes 31, at either end, and a central extension rod 32 which slides into the drive shaft tubes 31 to adjust its length. The preferred material for the drive shaft tubes is aluminum tubing stock having an outside diameter of ½ inch and an inside diameter of 0.251 inches. The preferred material for the central extension rod is stainless steel ground stock rod having an outside diameter of 0.250 inches. The drive shaft tubes are fastened to the central extension rod with four ¼-20-3/16 inch set screws 33; this adjusts and locks the take-up spool 30 to the proper matching length of the containment tube 20. The drive shaft tubes 31 of the take-up spool 30 have two close tolerance bearing pins 34 pressed into them at the ends opposite the central extension rod. These bearing pins 34 fit into and rotate on two 0.625 OD×0.250 ID bearings 35 set into the bearing end plate 36 and the motor mounting end plate 37 of the containment cylinder. The preferred material of the bearing pins is ground stock stainless steel rod having an outside diameter of 0.250 inches. There is also a similar but unevenly spaced end cap plate 38 at the motor end of the containment tube to seal the receiver-motor chamber 39. The preferred material for the end plates is ¼ inch stock aluminum. However, other material selections, including a variety of plastics may produce satisfactory results for: the central extension rod, the drive shafts, the curved sections, and end plates of the containment tube unit.

Figure 7:
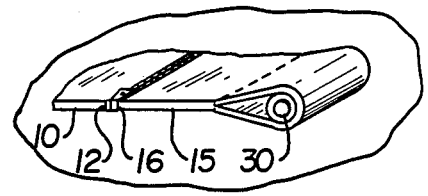
FIG. 7 is a partial isometric view of the trailing edge of the cover means, the leader material fastened to the take-up spool and the releasable fastening means between the leader and the cover means.

The 12 volt DC, 100 to 150 RPM, cover means drive motor 23, wireless control receiver 21, and receiver/motor interface logic and circuitry 22 are mounted in the chamber 39 between the two closely-spaced aluminum end plates, 37 and 38. The take-up spool 30 is mounted on bearings 35 between the two adjacent widely-spaced end plates, 36 and 37. One of the take-up spool mounting bearing pins 34 projects through the end plate 37 of the cylindrical containment tube and is used to drive the take-up spool 30 by the cover means drive motor 23. The trailing edge 12 of the cover means 10 is fastened to the take-up spool through a short detachable leader of cover material 15, FIG. 7. This permits unzippering or mechanically unsnapping (velcro material may be used to fasten the leader to the cover also) a releasing device 16 between the cover and the leader, for washing, cleaning or water proofing. The leader is fastened to the take-up spool by either slitting the take-up spool and inserting and fastening the end of the cover in the slit, or using mechanical fasteners such as screws or rivets, or by adhering with a suitable adhesive. The leader section may or may not be made of the same material as the cover means.

Figure 11:
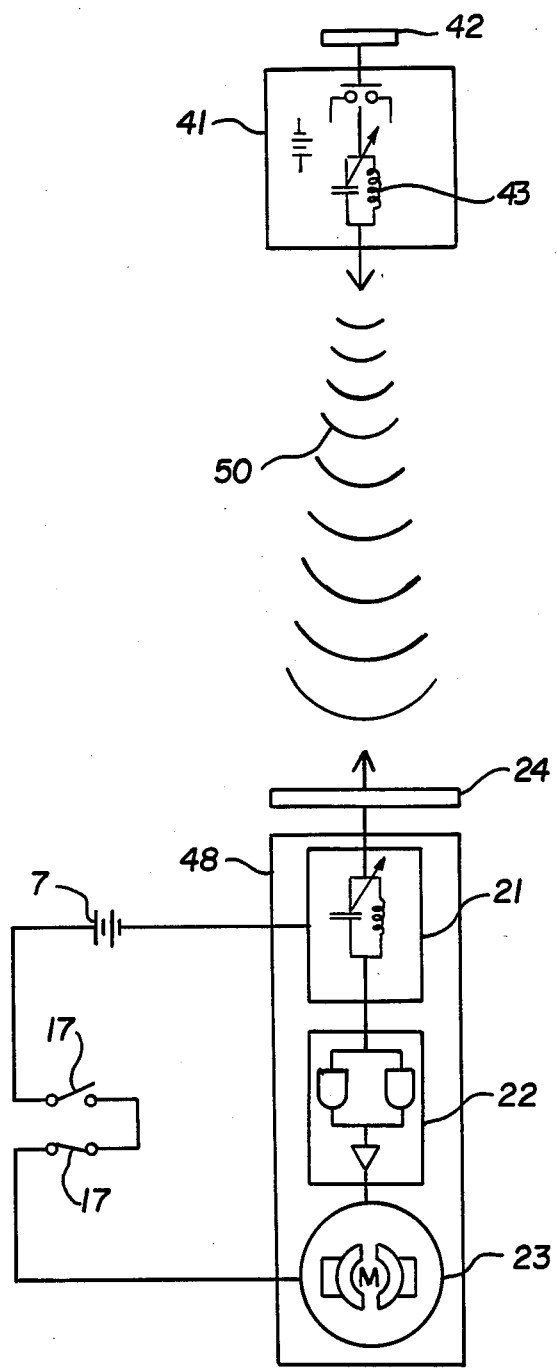
FIG. 11 is a schematic of the control circuitry of this invention showing the wireless remote control means including remote motor control, radio frequency transmitter and a wireless receiver station including the wireless control receiver, receiver/motor interface logic and circuitry and the cover means drive motor.

FIG. 11 is a symbolic schematic of the control circuitry of this invention showing the wireless remote control means 41 including remote motor control 42, radio frequency transmitter 43 and a wireless receiver station 48 including a wireless control receiver 21, receiver antenna 24, receiver/motor interface logic circuitry 22 and the cover means drive motor 23. This circuitry is connected to the vehicle battery 7. The wireless control receiver 21 in the receiver-motor chamber 39 between the motor mounting end plate 37 and the cap end plate 38 is activated by a radio signal 50 from the radio frequency transmitter 43 which is typically housed in the control wand means 40. Ultrasonic, infrared, microwave or other transmission media can also be used as a wireless control link between the control wand and containment tube. The cover means drive motor 23 is activated through the motor/receiver interface logic and circuitry 22 which also contains a relay system (either solid state logic or mechanical), to activate the cover means motor 23. The circuitry logic is designed such that the remote motor control button 42 must be depressed continuously to permit the operation of the winding/unwinding drive motor as a safety feature of this invention. Limited control switches 17 are also used to turn the motor off when the cover has reached either its fully extended or fully retracted positions. The circuitry is also designed such that the motor rotation is reversible with a single button control.

An alternate preferred embodiment of this invention uses a helical retractive spring 51 system to retract the cover means 10 into the cylindrical cover means containment tube 20 in place of the cover means drive motor 23. Two helical retractive springs 51 are mounted over both drive shafts 31 of the take-up spool 30 of the winding and unwinding means. One end of each helical retractive spring 51 is mounted in a hole 53 in the motor mounting plate or the bearing end plate and the other end of each spring is mounted in a hole 54 in each of the two drive shafts 31. Each of the springs are covered by a protective tube 52. A remotely controllable solenoid 55 is mounted on the containment tube end plate 37. A solenoid circular indexing plate 56 having a circular array of index holes is also mounted on the end plate with a lock washer and mounting nut system 57. When the solenoid is energized, the central solenoid magnetically actuated pin 58 is withdrawn from the indexing plate and allows the helical retractive spring to unwind, thus releasing the cover retractive energy.

The cover means 10 is manually withdrawn from the containment tube and installed on the vehicle using the control wand means 40 to direct it over the vehicle surface. The withdrawing exercise also generates and stores, via the helical retractive springs 51 mounted around both of the drive shafts 31 of the take-up spool 30, the needed energy to ultimately retract the cover means 10 back into the containment storage tube 20. The cover means extraction or retraction operations are activated by a wireless transmitted radio signal 50 from the wireless remote control means 41 to the wireless control receiver. The helical retractive springs 51 are engaged by remotely energizing the solenoid 55 via the receiver/motor interface logic and circuitry system 22. When the solenoid 55 is energized, the pin 58 of the solenoid is retracted from the solenoid indexing hole plate 56 thus releasing the energy to retract the cover means 10. The control wand means 40 is used to direct the cover means over the vehicle surface into the cylindrical cover means containment tube onto the take-up spool winding and unwinding means 30.

The usefulness of this invention stems from the simplicity of its concept and design and subsequent ease of building, manufacturing and ultimate usage. The remote control wand allows for precise control of the take-up spool winding and unwinding means when extracting or retracting the vehicle cover. The covering or uncovering operations are easily accomplished, with one hand, even in windy conditions. Because of the speed in which the covering or uncovering operations are performed, especially in covering, a blanket of trapped air between the cover and body of the vehicle serves to "float" the cover onto the vehicle. This remote control power-assisted vehicle cover invention offers total control over the covering and uncovering operations, while avoiding the cumbersome mechanisms, fixtures and attachments of other automatic or semi-automatic vehicle covers.

Having described our invention in detail what we claim is:

1. A cover apparatus for an automotive vehicle and the like, comprising in combination:
   a cover means of a pliable material for enveloping a body area of the vehicle;
   a hollow cylindrical containment tube adapted to be mounted under a bumper of said vehicle for housing the cover means, including a pair of end plates secured at opposed ends of said tube and having an entry slit area formed therein, said containment tube further including a take-up spool means rotatably mounted therein for retracting and extracting the cover means through said entry slit in the containment tube, said tube also including an eccentric mouth configuration at said entry slit adapted to eliminate fold-back and tangling of said cover means during retraction and extraction thereof, said containment tube further including telescoping means comprising a plurality of pre-formed telescoping interleaving sections to permit longitudinal adjustment of said containment tube;
   a rod-shaped control wand means attached to a leading end of said cover means for physically guiding said cover means onto and off of said vehicle;
   a remote controlled drive motor means mounted within said containment tube for rotating said take-up spool means;
   a wireless radio frequency control receiver including interface logic and circuitry means for controlling said drive motor means; and
   a wireless radio frequency remote transmitter control means mounted on said control wand means for remotely controlling said drive motor by sending a signal to said wireless radio frequency control receiver, whereby said cover means is selectively wound onto or off the take-up reel of said containment tube.

2. A cover apparatus as claimed in claim 1 wherein the trailing edge of said pliable material cover means is detachably attached by releasable fastening means to a leader section of pliable material, which is in turn attached to said take-up spool means, to permit removal of the cover means for washing, cleaning or exchanging of the liable material cover.

3. A cover apparatus as claimed in claim 1 wherein a locking mechanism is attached to the vehicle to mate with a locking means attached to the control wand means at the leading edge of said the pliable material cover means for locking said pliable cover means in place on said vehicle.

4. A cover apparatus as claimed in claim 1, wherein said pliable material cover is a light color, whereby the heat from the sun is reflected away from the cover.

5. A cover apparatus as claimed in claim 1 wherein the underside of said pliable material cover is dark in color to absorb heat radiated and conducted from beneath, thereby transmitting heat away from the hot vehicle surface.

6. A cover apparatus as claimed in claim 1 wherein the cover means entry slit of the cylindrical containment tube has a plurality of rollers mounted on both sides of the entry opening lip to reduce friction of the cover means against the containment tube housing and facilitate extracting or retracting the said cover means.

* * * * *

UNITED STATES PATENT AND TRADEMARK OFFICE
CERTIFICATE OF CORRECTION

PATENT NO. : 4,848,823
DATED : July 18, 1989
INVENTOR(S) : Arno K. Flohr and Edward J. Fasiska It is certified that error appears in the above-identified patent and that said Letters Patent is hereby corrected as shown below:

Column 1 Line 61 "automotible" should read --automobile--.

Column 2 Line 14 "coverying" should read --covering--.

Column 2 Line 30 "emans" should read --means--.

Column 4 Line 21 "cotnrol" should read --control--.

Column 4 Line 35 "if" should read --it--.

Column 5 Line 34 "performed" should read --preformed--.

Claim 2 Line 43 Column 8 "liable" should read --pliable--.

Column 8 line 47 "said the pliable" should read --the said pliable--.

Signed and Sealed this

Eleventh Day of September, 1990

Attest:

HARRY F. MANBECK, JR.

Attesting Officer

Commissioner of Patents and Trademarks